United States Patent
Yoshihara et al.

(10) Patent No.: US 11,036,668 B2
(45) Date of Patent: Jun. 15, 2021

(54) ELECTRONIC APPARATUS INCLUDING DEVICE CONFIGURED TO BE SHIFTED TO POWER SAVING STATE AND CONNECTED TO PCI DEVICE, AND CONTROL METHOD THEREOF

(71) Applicant: CANON KABUSHIKI KAISHA, Tokyo (JP)

(72) Inventors: Toshio Yoshihara, Kawasaki (JP); Hiroaki Niitsuma, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/774,426

(22) Filed: Jan. 28, 2020

(65) Prior Publication Data

US 2020/0250125 A1 Aug. 6, 2020

(30) Foreign Application Priority Data

Feb. 6, 2019 (JP) .............................. JP2019-020148

(51) Int. Cl.
*G06F 13/42* (2006.01)
*G06F 1/3234* (2019.01)
*G06F 13/16* (2006.01)

(52) U.S. Cl.
CPC ........ *G06F 13/4221* (2013.01); *G06F 1/3253* (2013.01); *G06F 13/1668* (2013.01); *G06F 2213/0024* (2013.01)

(58) Field of Classification Search
CPC . G06F 13/1668; G06F 13/4221; G06F 1/3253
See application file for complete search history.

(56) References Cited

U.S. PATENT DOCUMENTS

| | | | | |
|---|---|---|---|---|
| 8,862,920 B2 * | 10/2014 | Branover | ............. | G06F 1/3275 713/323 |
| 9,141,178 B2 * | 9/2015 | Priel | ............. | G01R 31/318536 |
| 9,465,646 B2 * | 10/2016 | Otomo | ................. | G06F 9/4887 |
| 10,365,706 B2 * | 7/2019 | Bakshi | ................. | G06F 1/3287 |
| 2005/0210312 A1 * | 9/2005 | Maruichi | ............. | G06F 1/3203 714/2 |
| 2009/0207423 A1 * | 8/2009 | Shimizu | ................... | G06F 1/32 358/1.1 |

(Continued)

FOREIGN PATENT DOCUMENTS

JP 2017-177573 A 10/2017

*Primary Examiner* — Henry Tsai
*Assistant Examiner* — Christopher A Daley
(74) *Attorney, Agent, or Firm* — Canon U.S.A., Inc. I.P. Division

(57) ABSTRACT

An electronic apparatus includes a semiconductor integrated circuit, another semiconductor integrated circuit connected to the semiconductor integrated circuit via a peripheral component interconnect (PCI) bus, and devices (a hard disk drive (HDD), and a dynamic random access memory (DRAM)) connected to the another semiconductor integrated circuit. The semiconductor integrated circuit transmits a predetermined instruction to the another semiconductor integrated circuit, and the another semiconductor integrated circuit shifts the PCI bus to a non-communicable state or a state communicable at low speed. Thereafter, the another semiconductor integrated circuit shifts the devices (the HDD and the DRAM) to a power saving state.

26 Claims, 12 Drawing Sheets

(56) References Cited

U.S. PATENT DOCUMENTS

2012/0284550 A1* 11/2012 Park ................... H04N 1/32593
    713/323
2015/0316953 A1* 11/2015 Nariai ................... B41J 29/393
    713/600

* cited by examiner

FIG.4

| OPERATION MODE | STATE OF DEVICE | ACTIVE | POWER SAVING |
|---|---|---|---|
| COPY MODE | | SEMICONDUCTOR INTEGRATED CIRCUIT 200A: ACTIVE<br>SEMICONDUCTOR INTEGRATED CIRCUIT 200B: ACTIVE<br>HDD 402: ACTIVE<br>PRINTER 104: POWER ON<br>SCANNER 103: POWER ON<br>OPERATION UNIT 102: POWER ON<br>LAN CONTROLLER 407: POWER ON | SEMICONDUCTOR INTEGRATED CIRCUIT 200A: POWER SAVING<br>SEMICONDUCTOR INTEGRATED CIRCUIT 200B: SLEEP<br>HDD 402: Slumber<br>PRINTER 104: POWER ON<br>SCANNER 103: POWER ON<br>OPERATION UNIT 102: POWER ON<br>LAN CONTROLLER 407: POWER ON |
| PRINT MODE | | SEMICONDUCTOR INTEGRATED CIRCUIT 200A: ACTIVE<br>SEMICONDUCTOR INTEGRATED CIRCUIT 200B: ACTIVE<br>HDD 402: ACTIVE<br>PRINTER 104: POWER ON<br>SCANNER 103: POWER OFF<br>OPERATION UNIT 102: POWER OFF<br>LAN CONTROLLER 407: POWER ON | SEMICONDUCTOR INTEGRATED CIRCUIT 200A: POWER SAVING<br>SEMICONDUCTOR INTEGRATED CIRCUIT 200B: SLEEP<br>HDD 402: Slumber<br>PRINTER 104: POWER ON<br>SCANNER 103: POWER OFF<br>OPERATION UNIT 102: POWER OFF<br>LAN CONTROLLER 407: POWER ON |
| SLEEP MODE | | SEMICONDUCTOR INTEGRATED CIRCUIT 200A: ACTIVE<br>SEMICONDUCTOR INTEGRATED CIRCUIT 200B: ACTIVE<br>HDD 402: ACTIVE<br>PRINTER 104: POWER OFF<br>SCANNER 103: POWER OFF<br>OPERATION UNIT 102: POWER OFF<br>LAN CONTROLLER 407: POWER ON | SEMICONDUCTOR INTEGRATED CIRCUIT 200A: POWER SAVING<br>SEMICONDUCTOR INTEGRATED CIRCUIT 200B: SLEEP<br>HDD 402: Slumber<br>PRINTER 104: POWER OFF<br>SCANNER 103: POWER OFF<br>OPERATION UNIT 102: POWER OFF<br>LAN CONTROLLER 407: POWER ON |
| DEEP-SLEEP MODE | | SEMICONDUCTOR INTEGRATED CIRCUIT 200A: POWER OFF<br>SEMICONDUCTOR INTEGRATED CIRCUIT 200B: POWER OFF<br>HDD 402: POWER OFF<br>PRINTER 104: POWER OFF<br>SCANNER 103: POWER OFF<br>OPERATION UNIT 102: POWER OFF<br>LAN CONTROLLER 407: POWER ON | |

302
303
304
305

SHIFTING FROM COPY MODE TO PRINT MODE

SHIFTING FROM PRINT MODE TO SLEEP MODE

SHIFTING FROM SLEEP MODE TO DEEP-SLEEP MODE

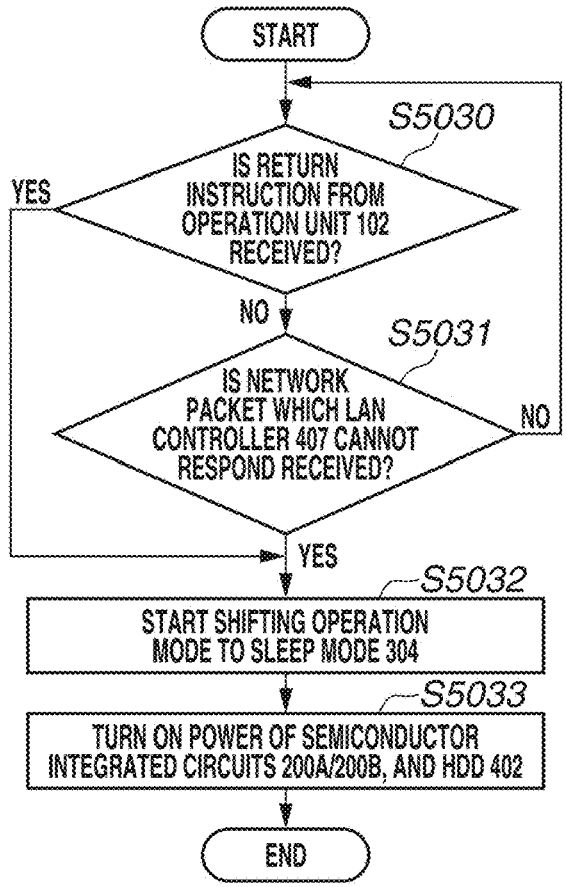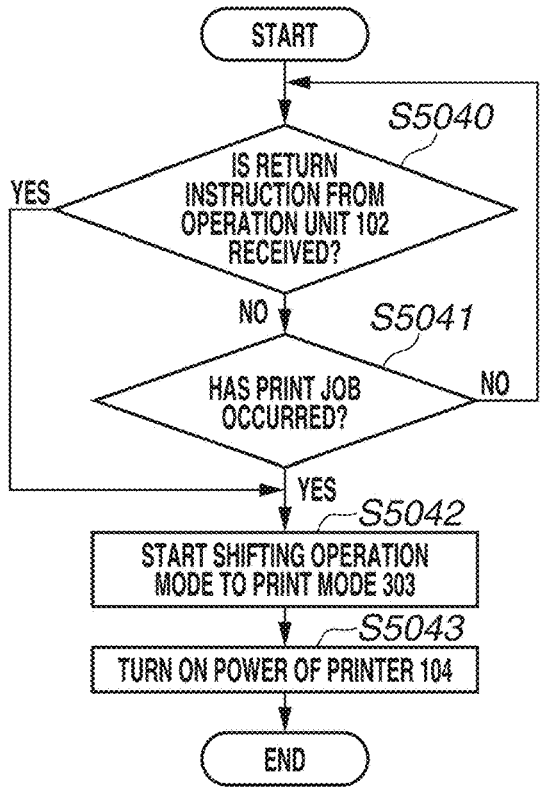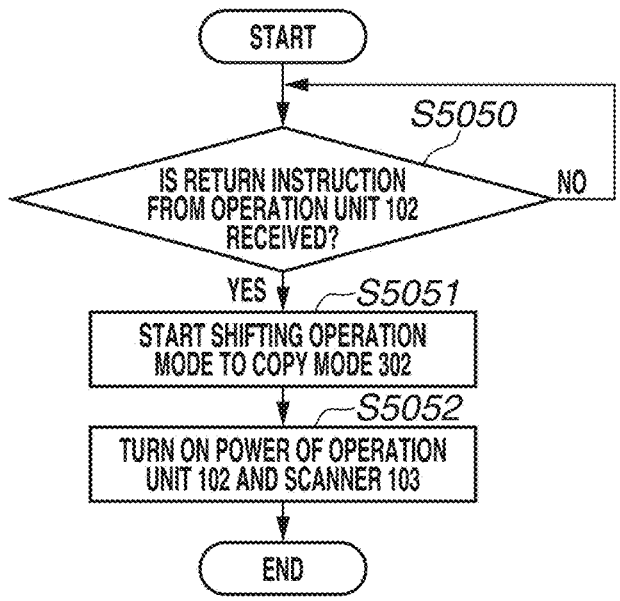

ELECTRONIC APPARATUS INCLUDING DEVICE CONFIGURED TO BE SHIFTED TO POWER SAVING STATE AND CONNECTED TO PCI DEVICE, AND CONTROL METHOD THEREOF

BACKGROUND OF THE INVENTION

Field of the Invention

The present invention relates to an electronic apparatus which includes a device configured to be shifted to a power saving state and is connected to a peripheral component interconnect (PCI) device.

Description of the Related Art

In recent years, there has been increasing interest in saving power of electronic apparatuses such as a personal computer (PC) and a multifunction printer (MFP), and legal restraints have been placed thereon. For example, there is provided a regulation called "Lot26" which defines an upper limit of power consumption at network standby. The Runtime D3 (hereinafter, called as "RTD3") is provided as a technique for realizing reduction of power consumption at network standby. The RTD3 is a technique which causes a peripheral component interconnect (PCI) device to enter a power saving state even when a central processing unit (CPU) is in an active state in a configuration in which PCI devices are connected to the CPU via a PCI Express (hereinafter, called as "PCIe") bus. A power state of the PCI device is defined as a D0 state or a D3 state. The D0 state corresponds to the active state, and the D3 state corresponds to the power saving state in which less power is consumed than in the active state. Further, a power state of a system of the electronic apparatus is defined as an S state. An S0 state corresponds to an active state, an S3 state corresponds to a suspended state, and an S5 state corresponds to a power off state. In the RTD3, the D state of the PCI device can be changed to the D0 or D3 state when the system is in the S0 or S3 state (See Japanese Patent Application Laid-Open No. 2017-177573).

Japanese Patent Application Laid-Open No. 2017-177573 discusses a method of shifting the PCI device to the power saving state; however, a power saving method for a device connected to the PCI device is not discussed. Since, in an electronic apparatus such as a PC, devices such as a dynamic random access memory (DRAM) and a hard disk drive (HDD) have tended to be connected to the PCI device in the recent years, it is necessary to shift these devices (hereinafter, called as "target devices") to the power saving state in order to bring the entire electronic apparatus into the power saving state.

SUMMARY OF THE INVENTION

In order to shift a target device connected to the PCI device to the power saving state, the CPU first transmits an instruction to shift the target device to the power saving state to the PCI device. Upon receipt of the instruction, the PCI device shifts the target device to the power saving state. However, in a case where the CPU accesses the target device via the PCI device when the target device is being shifted or has been shifted to the power saving state, the target device is not accessible, or the access speed is slow. This may result in a time-out error to occur. Because it is not possible to manage restrictions on access from various applications executed by the CPU with respect to the devices connected to the PCI device, an error occurs when the CPU accesses the target device.

The present invention is directed to a technique of shifting a device connected to a PCI device to a power saving state without occurrence of an access error.

According to an aspect of the present invention, an electronic apparatus of the present invention includes a first device, a second device connected to the first device via a peripheral component interconnect (PCI) bus, and a third device connected to the second device. The first device transmits a predetermined instruction to the second device, and the second device shifts the third device to a power saving state after shifting the PCI bus to a non-communicable state or a state communicable at low speed.

Further features of the present invention will become apparent from the following description of embodiments with reference to the attached drawings.

BRIEF DESCRIPTION OF THE DRAWINGS

FIG. 4 is a table illustrating operation modes of the image forming apparatus and power states of components thereof according to the embodiment of the present invention.

FIGS. 5A to 5F are flowcharts illustrating a shifting sequence of the operation modes according to the embodiment of the present invention.

DESCRIPTION OF THE EMBODIMENTS

An embodiment embodying the present invention will be described with reference to the appended drawings.
<Image Forming Apparatus>

Figure 1:
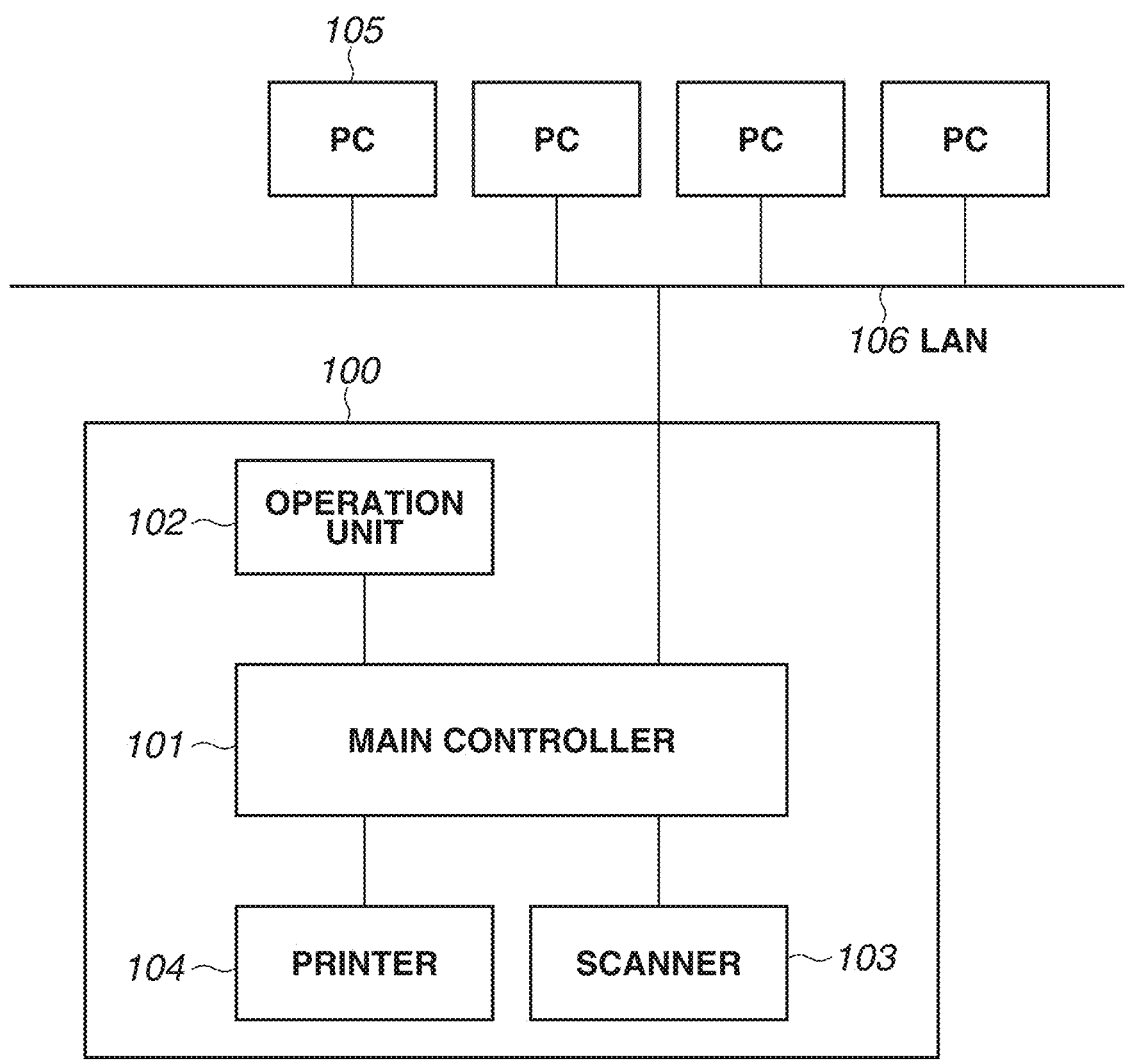
FIG. 1 is a block diagram illustrating a configuration of a system including an image forming apparatus according to an embodiment of the present invention.

A first embodiment will be described. FIG. 1 is a block diagram illustrating a configuration of a system including an image forming apparatus 100. The image forming apparatus 100 is a multifunction printer (MFP) which executes image input/output and various types of image processing. The image forming apparatus 100 includes a main controller 101, an operation unit 102 serving as a user interface, a scanner 103 serving as an image input device, and a printer 104 serving as an image output device. Each of the operation unit 102, the scanner 103, and the printer 104 is communicably connected to the main controller 101, and operates according to an instruction from the main controller 101. Further, the main controller 101 is connected to a local area network (LAN) 106, so as to be communicable via a network. A personal computer (PC) 105 can communicate with the image forming apparatus 100 via the LAN 106. A user inputs a printing instruction using an application (printer driver) operating on the PC 105, so that a print job is transmitted to the image forming apparatus 100 from the PC 105. The operation unit 102 includes a display unit and a touch panel for detecting a touch operation performed on the display unit. The operation unit 102 further includes a hard key for providing a copying execution instruction, numerical keys, and a hard key for shifting or returning the image forming apparatus 100 to/from a sleep mode.

Figure 2:
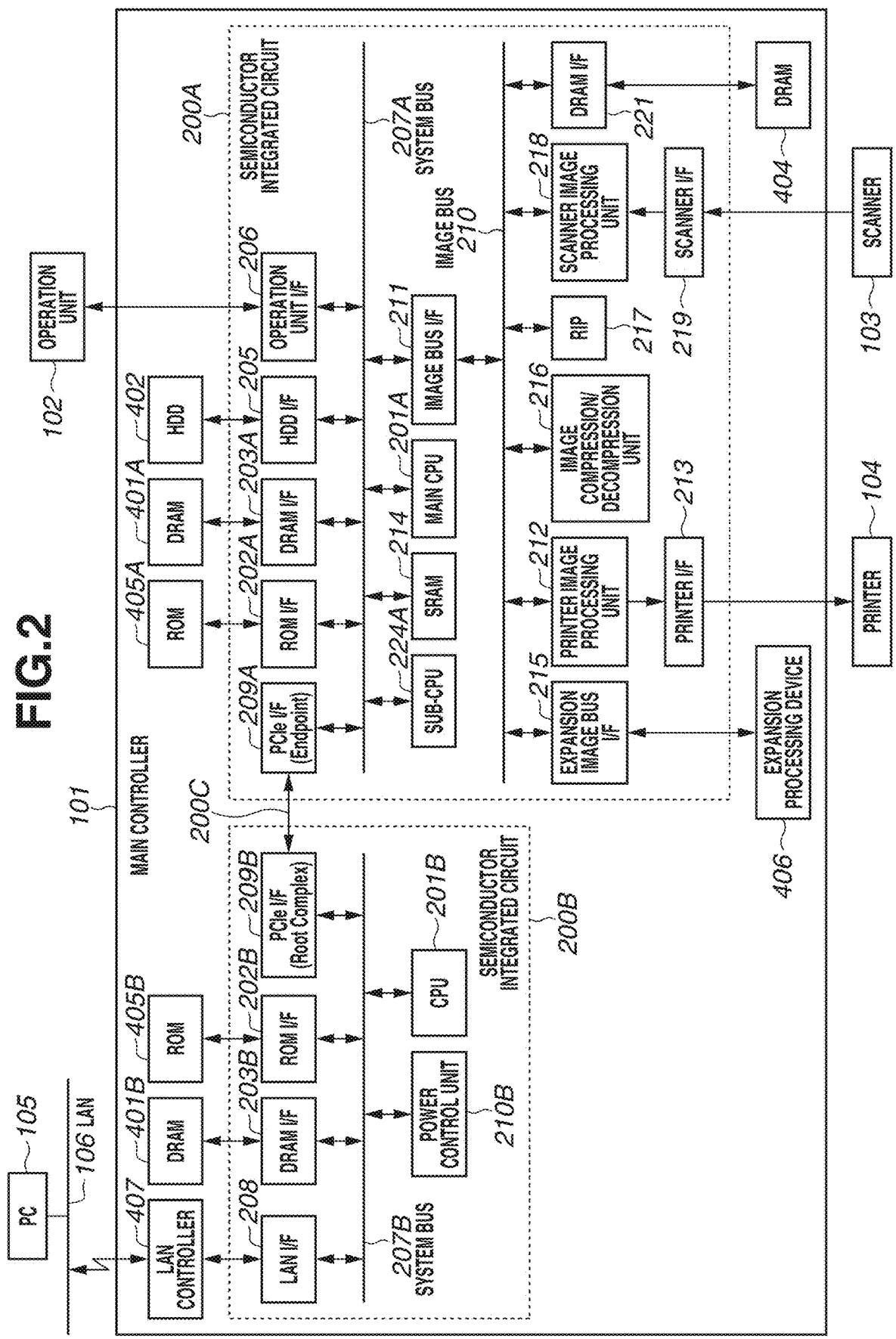
FIG. 2 is a configuration diagram of a main controller of the image forming apparatus according to the embodiment of the present invention.

FIG. 2 is a block diagram illustrating details of a main controller 101. The main controller 101 includes a semiconductor integrated circuit 200A mainly executing image processing and a semiconductor integrated circuit 200B mainly executing general information processing and controlling a state of the apparatus. The semiconductor integrated circuits 200A and 200B can communicate with each other via a peripheral component interconnect express (PCIe) bus 200C. The semiconductor integrated circuit 200A is communicably connected to the scanner 103 and the printer 104. The semiconductor integrated circuit 200A is also communicably connected to the operation unit 102. The semiconductor integrated circuit 200B is connected to the LAN 106 via a LAN controller 407.

Next, the semiconductor integrated circuit 200A will be described in detail. The semiconductor integrated circuit 200A includes a main central processing unit (CPU) 201A as a main control unit. The main CPU (main processor) 201A is connected to a sub-CPU 224A and a static random access memory (SRAM) 214 via a system bus 207A. The main CPU 201A also is connected to a PCIe interface (I/F) 209A, a read only memory (ROM) I/F 202A, a dynamic RAM (DRAM) I/F 203A, a hard disk drive (HDD) I/F 205, an operation unit I/F 206, and an image bus I/F 211 via the system bus 207A. A ROM 405A is a read only memory which stores a boot program for activating the semiconductor integrated circuit 200A, a predetermined execution program, and settings used for initialization processing for each module included in the semiconductor integrated circuit 200A. The ROM 405A is connected to the semiconductor integrated circuit 200A via the ROM I/F 202A. The sub-CPU 224A is a sub-processor for assisting the main CPU 201A, and executes control of a part of the modules included in the semiconductor integrated circuit 200A and power control of the semiconductor integrated circuit 200A. The SRAM 214 is a small-scale storage area built into the semiconductor integrated circuit 200A. The SRAM 214 is used as a loading destination of a boot program read from the ROM 405A. The SRAM 214 is also used as a work memory for operating a program of the sub-CPU 224A. The DRAM 401A is a storage area readable and writable at any time, which provides a work area used as a work memory of the main CPU 201A. Further, the DRAM 401A is used for storing a temporary setting value of the image forming apparatus 100 and information about a job to be executed. The DRAM I/F 203A is an interface that connects the DRAM 401A and the system bus 207A to each other. The DRAM I/F 203A includes a memory controller for controlling the DRAM 401A, and reads and writes data from/to the DRAM 401A. The HDD 402 is a non-volatile storage area used as an area for storing an operating system (OS) of the system. The HDD 402 is also used as a storage area for temporarily storing a large volume of image data. The HDD I/F 205 is a high-speed interface which connects the HDD 402 and the system bus 207A to each other and is compliant with, for example, the Serial Advanced Technology Attachment (SATA) standard. The PCIe I/F (PCI interface) 209A is an interface compliant with the PCI Express standard, which communicably connects the semiconductor integrated circuit 200A as an endpoint and the below-described semiconductor integrated circuit 200B as a root complex. Then, the PCIe I/F 209A exchanges data between the semiconductor integrated circuits 200A and 200B. The operation unit I/F 206 is an interface for executing input/output processing with the operation unit 102. The operation unit I/F 206 outputs image data to be displayed to the operation unit 102. Further, the operation unit I/F 206 outputs information received from the user via the operation unit 102 to the CPU 201A. When the operation unit 102 receives a user input, the operation unit I/F 206 outputs an interrupt signal for notifying the main CPU 201A, the sub-CPU 224A, and the below-described CPU 201B that the input is received. The image bus I/F 211 is an interface which connects the system bus 207A and an image bus 210 for transferring image data at high speed, and operates as a bus bridge for converting a data structure.

A DRAM I/F 221, a scanner image processing unit 218, a raster image processor (RIP) 217, an image compression/decompression unit 216, a printer image processing unit 212, and an expansion image bus I/F 215 are connected to the image bus 210. Similar to the DRAM I/F 203A, the DRAM I/F 221 includes a memory controller for controlling a DRAM 404, and reads and writes data from/to the DRAM 404. The DRAM 404 is used as a buffer memory for temporarily storing image data to be transferred via the image bus 210 without the DRAM 401A connected to the system bus 207A. The scanner I/F 219 is an interface for connecting the scanner 103 and the scanner image processing unit 218, and converts a data format of the scanned image. The scanner image processing unit 218 executes correction, processing, editing on the image data scanned by the scanner 103. For example, the RIP 217 converts page description language (PDL) data which the PC 105 has transmitted as a print job into a bitmap image. The image compression/decompression unit 216 executes Joint Photographic Experts Group (JPEG) compression/decompression processing on multi-value image data, and executes Joint Bi-level Image Experts Group (JBIG) compression/decompression processing on binary image data. The printer image processing unit 212 executes processing such as color conversion processing, filter processing, and resolution conversion processing on print output image data to be output to the printer 104. The printer I/F 213 is an interface for connecting the printer 104 and the printer image processing unit 212, and executes synchronous/asynchronous conversion of image data. The expansion image bus I/F 215 is an expansion interface for mutually transmitting and receiving image data on the image bus 210 to/from an expansion processing device 406 externally connected to the semiconductor integrated circuit 200A. The expansion processing device 406 executes expansion of the image processing function provided by the above-described semiconductor integrated circuit 200A. Examples of the expansion processing device 406 includes a device which executes control processing for inhibiting an unauthorized copy by detecting a copy-forgery-inhibited pattern of scanned image data. The expansion processing device 406 will not be connected to the expansion image bus I/F 215 in a case where expansion of the function of the image forming apparatus 100 is not necessary.

Next, details of the semiconductor integrated circuit 200B will be described. The semiconductor integrated circuit 200B includes a CPU 201B as a main control unit. The CPU 201B is connected to a PCIe I/F 209B, a ROM I/F 202B, a DRAM I/F 203B, a LAN I/F 208, and a power control unit 210B via a system bus 207B. The PCIe I/F 209B is an interface compliant with the PCI Express standard, which communicably connects the semiconductor integrated circuit 200B as a root complex and the semiconductor integrated circuit 200A as an endpoint. Then, the PCIe I/F 209B exchanges data between the semiconductor integrated circuits 200A and 200B. A ROM 405B is a read only memory which stores a boot program for activating the semiconductor integrated circuit 200B, a predetermined execution program, and settings used for initialization processing of each module included in the semiconductor integrated circuit 200B. The ROM 405B is connected to the semiconductor integrated circuit 200B via the ROM I/F 202B. The DRAM 401B is a storage area readable and writable at any time, which provides a work area used as a work memory of the CPU 201B. The DRAM I/F 203B is an interface for connecting the DRAM 401B and the system bus 207B. The DRAM I/F 203B includes a memory controller for controlling the DRAM 401B, and reads and writes data from/to the DRAM 401B. The LAN I/F 208 is an interface for connecting the LAN controller 407 and the system bus 207B. The LAN I/F 208 transmits and receives information to/from the LAN 106 via the LAN controller 407. The LAN controller 407 transmits and receives image information, device information, and files to/from an external device such as the PC 105 connected to the LAN 106 via the LAN 106, and executes processing corresponding to a network packet transmitted via the LAN 106. The power control unit 210B supplies and stops supplying power to each of the devices of the image forming apparatus 100. In addition, the power control unit 210B may be arranged outside the semiconductor integrated circuit 200B.

<Operation Mode>

Figure 3:
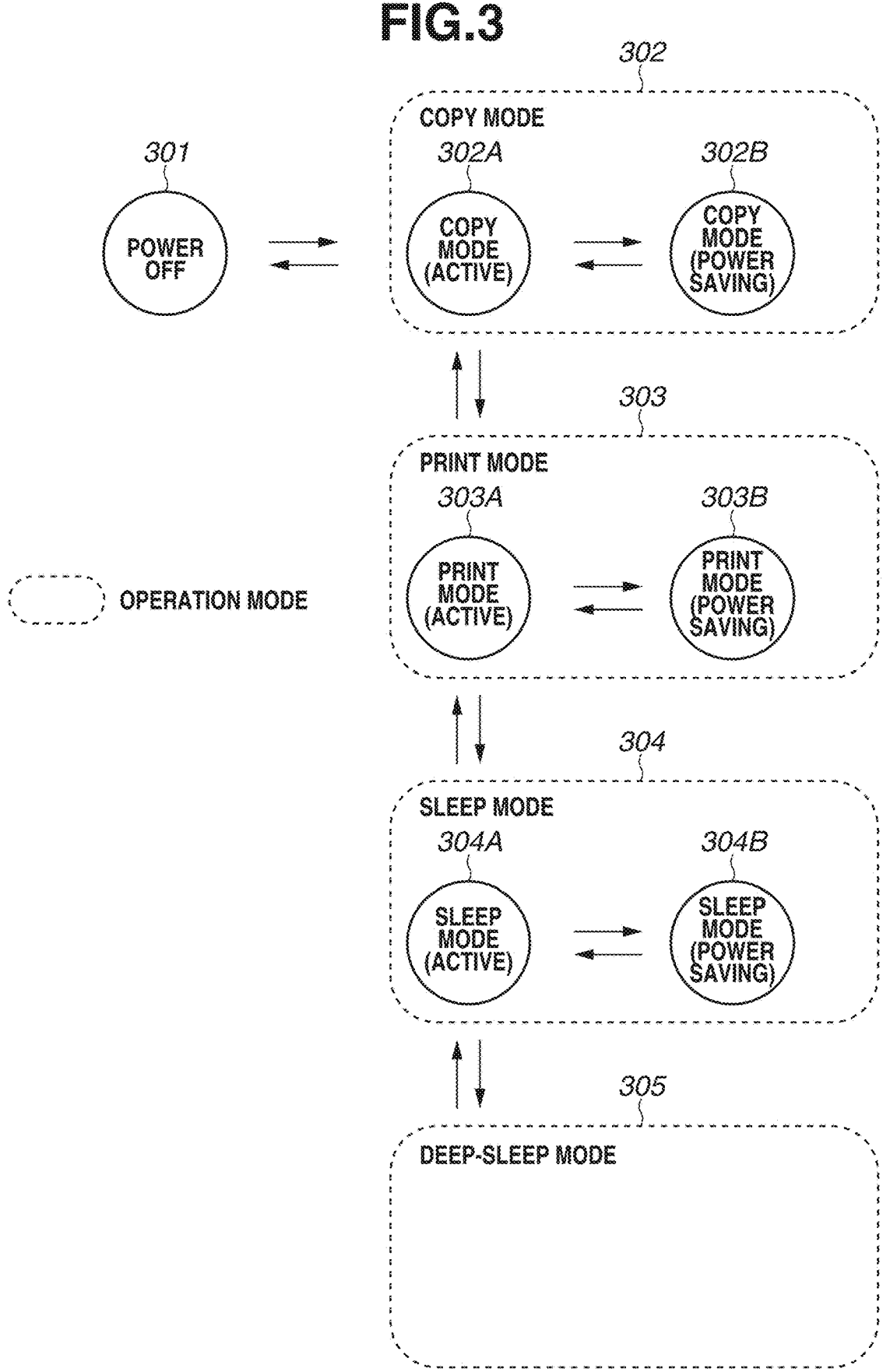
FIG. 3 is a diagram illustrating a power state of the image forming apparatus according to the embodiment of the present invention.

FIG. 3 is a state shifting diagram illustrating operation modes of the image forming apparatus 100.

The image forming apparatus 100 of the present embodiment has a copy mode 302, a print mode 303, a sleep mode 304, and a deep-sleep mode 305 as the operation modes. The copy mode 302, the print mode 303, and the sleep mode 304 corresponds to the S0 state of the S states defined in the Advanced Configuration and Power Interface (ACPI) standard. The deep-sleep mode 305 corresponds to the S3 state of the S states defined in the ACPI standard. The CPU 201B controls and manages the operation modes according to a program which the CPU 201B executes on the DRAM 401B. Except for the deep-sleep mode 305, each of the operation modes has an active state and a power saving state where power consumption is reduced by inactivating or limiting a part of the functions.

Further, the image forming apparatus 100 has a power off state 301. A power switch (not illustrated) is disposed on the image forming apparatus 100, and power supply to the entirety of the image forming apparatus 100 is shut off when the power switch is turned off. In the power off state 301, power may be supplied to a part of the devices such as a clock (not illustrated) and a circuit for monitoring the operation performed on the power switch (not illustrated).

[Copy Mode]

When the power switch (not illustrated) is turned on, the image forming apparatus 100 shifts to the copy mode 302. In the copy mode 302, power is supplied to the entirety of the image forming apparatus 100. The copy mode 302 refers to a state where various jobs such as a copy job and a print job are being executed or can be executed immediately. In the copy mode 302, the image forming apparatus 100 receives an instruction from the user who is operating the image forming apparatus 100 via the operation unit 102, and executes various jobs. The display unit of the operation unit 102 is turned on.

[Copy Mode (Active State)]

The image forming apparatus 100 is in an active state 302A of the copy mode 302 while a job is being executed in the copy mode 302. In the active state 302A, as illustrated in FIG. 4, a clock and power are supplied to the modules within the semiconductor integrated circuits 200A and 200B necessary for executing copying and printing. In the active state 302A, the CPU 201B of the semiconductor integrated circuit 200B is in a normal operation state corresponding to the C0 state of the C states defined in the ACPI standard. The semiconductor integrated circuit 200A that is connected to the semiconductor integrated circuit 200B via the PCIe I/F 209A is in the D0 state (i.e., normal operation state) of the D states defined in the ACPI standard. In the active state 302A of the copy mode 302, the HDD 402 can receive and transmit data, and power is supplied to the printer 104, the scanner 103, the operation unit 102, and the LAN controller 407 so that they are in an operable state.

[Copy Mode (Low Power State)]

When execution of a job such as a copy job or a print job is ended, or a predetermined time has passed after execution of the job, as illustrated in FIG. 4, the image forming apparatus 100 is shifted to a low power state (power saving state) 302B of the copy mode 302. In the low power state (power saving state) 302B, supply of a clock and power is stopped or reduced with respect to the modules of the semiconductor integrated circuits 200A and 200B which are not in use. In the low power state (power saving state) 302B, the CPU 201B of the semiconductor integrated circuit 200B is in a C3 state, i.e., a sleep state with less power consumption. Further, the semiconductor integrated circuit 200A connected to the semiconductor integrated circuit 200B via the PCIe I/F 209A is in the D3 state, i.e., a power saving state. The HDD 402 is in a Slumber state, i.e., a power-saving state defined in the SATA standard. When a copy job or a print job is received in the low power state (power saving state) 302B of the copy mode 302, the above-described various devices are returned from the power saving state within a short period of time and enters the active state 302A where execution of the job can be started immediately.

[Print Mode]

The image forming apparatus 100 shifts to the print mode 303 when a predetermined time has passed without receiving an operation instruction via the operation unit 102 in the copy mode 302. The print mode 303 refers to a state where a print job is being executed or can be executed immediately. The print mode 303 is an operation mode in which a print job received via the LAN 106 is executed. In the print mode 303, power supply is stopped with respect to the scanner 103 and the operation unit 102 which are not used, so that more power can be saved than in the copy mode 302. The display unit of the operation unit 102 is turned off in the print mode 303.

[Print Mode (Active State)]

The image forming apparatus 100 is in the active state 303A of the print mode 303 while a job is being executed in the print mode 303. As illustrated in FIG. 4, a clock and power are supplied to the modules of the semiconductor integrated circuits 200A and 200B which are necessary for executing printing. The active state 303A is similar to the active state 302A of the copy mode 302 except that power supply is stopped with respect to the scanner 103 and the operation unit 102 which are not used.

[Print Mode (Low Power State)]

When execution of a job such as a print job is ended or a predetermined time has passed after execution of the job, as illustrated in FIG. 4, the image forming apparatus 100 is shifted to a low power state (power saving state) 303B of the print mode 303. In the low power state (power saving state) 303B, supply of a clock and power is stopped or reduced with respect to the modules of the semiconductor integrated circuits 200A and 200B which are not in use. The low power state (power saving state) 303B is similar to the low power state (power saving state) 302B of the copy mode 302 except that power supply is stopped with respect to the scanner 103 and the operation unit 102 which are not used.

[Sleep Mode]

The image forming apparatus 100 shifts to the sleep mode 304 when a predetermined time has passed without occurrence of any job in the print mode 303. The sleep mode 304 refers to a state where the CPU 201B is responding to an inquiry from the network via the LAN 106 or standing ready while supplying power to the added expansion processing device 406. The sleep mode 304 is a power saving operation mode in which the image forming apparatus 100 is ready to shift to the print mode 303 or the copy mode 302. In the sleep mode 304, power supply is stopped with respect to the printer 104 and the scanner 103 which are not used, so that more power can be saved than in the print mode 303 and the copy mode 302. The sleep mode 304 also has an active state and a low power state (power saving state).

[Sleep Mode (Active State)]

In the active state 304A of the sleep mode 304 as illustrated in FIG. 4, a clock and power are supplied to the modules of the semiconductor integrated circuits 200A and 200B necessary for receiving an inquiry from the network. In the active state 304A of the sleep mode 304, power supply is stopped with respect to the printer 104 that is not used. Since most of the functional modules within the semiconductor integrated circuit 200A which are used for image processing are not used in the active state 304A, supply of a clock and power thereto can be stopped or reduced. Therefore, power consumption can be reduced considerably in comparison to that in the active state 303A of the print mode 303.

[Sleep Mode (Power Saving State)]

As illustrated in FIG. 4, after the CPU 201B transmits a network response or when the expansion processing device 406 is in a stand-by state, supply of a clock and power is stopped or reduced with respect to the modules of the semiconductor integrated circuits 200A and 200B which are not in use. In the power saving state 304B of the sleep mode 304, power supply is stopped with respect to the printer 104 that is not used. Since most of the modules within the semiconductor integrated circuit 200A are not used, supply of a clock and power is stopped or reduced with respect to these modules. Therefore, power consumption in the power saving state 304B of the sleep mode 304 is less than the power consumption in the low power state (power saving state) 303B of the print mode 303.

[Deep-Sleep Mode]

The image forming apparatus 100 shifts to the deep-sleep mode 305 when a predetermined time has passed after the CPU 201B transmits the last network response. In the deep-sleep mode 305, power is supplied to only a module that is necessary for the image forming apparatus 100 to return from the deep-sleep mode 305, such as the LAN controller 407. The deep-sleep mode 305 is a most power-saving operation mode in which the image forming apparatus 100 stands ready while maintaining the network connection. For example, the LAN controller 407 returns a necessary response to a network packet of a protocol such as an address resolution protocol (ARP), an internet control message protocol (ICMP), or a simple network management protocol (SNMP), so that the image forming apparatus 100 maintains the state of the deep-sleep mode 305.

<Flowchart for Shifting of Operation Mode>

Figure 5A:
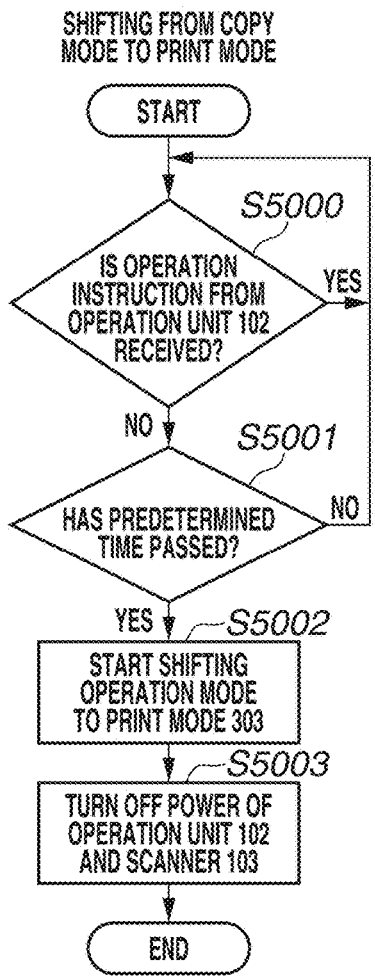

FIGS. 5A to 5F are flowcharts illustrating a shifting sequence of the operation modes of the image forming apparatus 100. The flowchart in FIG. 5A illustrates processing for shifting the image forming apparatus 100 to the print mode 303 from the copy mode 302. This flowchart is executed by the CPU 201B controlling the various devices of the image forming apparatus 100 according to a program executed in the DRAM 401B.

In the copy mode 302, power is supplied to the operation unit 102, and a screen that prompts the user to operate the image forming apparatus 100 is displayed. In step S5000, the CPU 201B determines whether the operation unit 102 receives an operation instruction from the user. When the operation unit 102 receives an operation instruction from the user (YES in step S5000), the image forming apparatus 100 executes a function according to the operation instruction. For example, when the operation unit 102 receives an instruction for executing a copying operation from the user, the image forming apparatus 100 executes the copying operation. The main controller 101 includes a timer (not illustrated) that starts counting when the most recent operation instruction is provided from the user. The main controller 101 resets the timer when a certain function is executed based on the operation instruction from the user. In step S5001, the CPU 201B determines whether a value counted after receiving the most recent operation instruction from the user exceeds a predetermined time. If the predetermined time has not passed (NO in step S5001), the processing returns to step S5000. In step S5000, the CPU 201B waits for an operation instruction from the user. On the other hand, if the predetermined time has passed after receiving the most recent operation instruction from the user (YES in step S5001), i.e., the image forming apparatus 100 has been in a non-operating state for a predetermined time, the processing proceeds to step S5002. In step S5002, the CPU 201B starts control processing for shifting the operation mode to the print mode 303. Next, in step S5003, the CPU 201B stops the power supply to the operation unit 102 and the scanner 103 that are not necessary for the print mode 303 so as to reduce the power consumption of the image forming apparatus 100. In addition, even in a state where the power supply to the operation unit 102 is stopped and the touch panel (not illustrated) is turned off, an operation input performed on the display unit of the operation unit 102 may be accepted. When the operation input is accepted, the touch panel (not illustrated) transmits an interrupt signal for changing the operation mode of the image forming apparatus 100 to the power control unit 210B.

Figure 5B:
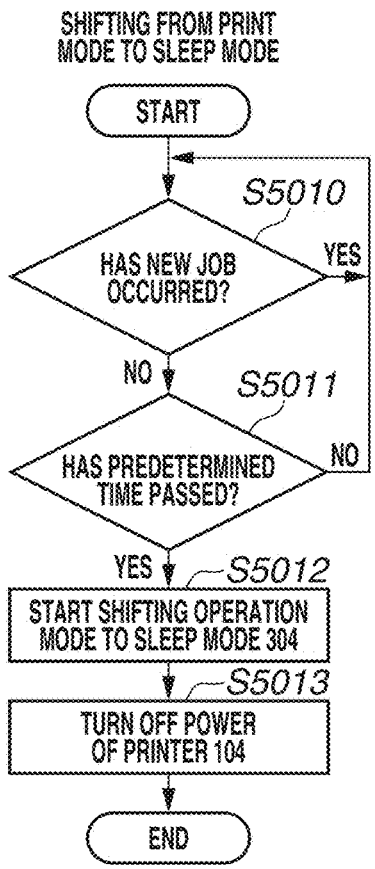

The flowchart in FIG. 5B illustrates processing for shifting the image forming apparatus 100 to the sleep mode 304 from the print mode 303. This flowchart is executed by the CPU 201B controlling the various devices of the image forming apparatus 100 according to a program executed in the DRAM 401B.

In step S5010, the CPU 201B determines whether a new job has been received. For example, if a print job is received via the LAN 106 in a state where power is supplied to the printer 104 in the print mode 303 (YES in step S5010), printing can be executed immediately. The main controller 101 includes a timer (not illustrated) that starts counting when the most recent job is ended, and resets the timer when any job is executed. In step S5011, the CPU 201B determines whether a value counted after the execution of the most recent job is ended exceeds a predetermined time. If the predetermined time has not passed (NO in step S5011), the processing returns to step S5010. In step S5010, the CPU 201B waits for a job to be entered. On the other hand, if the predetermined time has passed after the execution of the most recent job is ended (YES in step S5011), i.e., no job has been executed in the predetermined time, the processing proceeds to step S5012. In step S5012, the CPU 201B starts control processing for shifting the operation mode to the sleep mode 304. Next, in step S5013, the CPU 201B stops the power supply to the printer 104 that is not necessary for the sleep mode 304 so as to reduce the power consumption of the image forming apparatus 100.

Figure 5C:
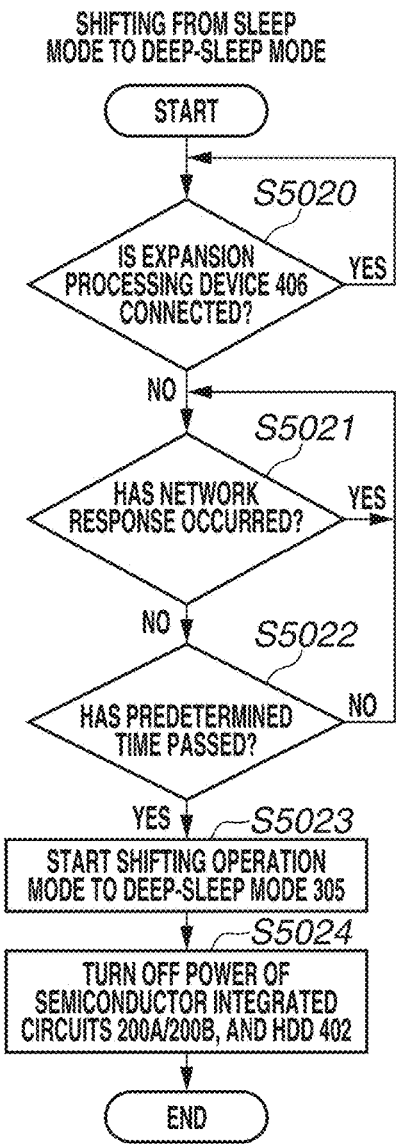

The flowchart in FIG. 5C illustrates processing for shifting the image forming apparatus 100 to the deep-sleep mode 305 from the sleep mode 304. This flowchart is executed by the CPU 201B controlling the various devices of the image forming apparatus 100 according to a program executed in the DRAM 401B. In step S5020, the CPU 201B determines whether the expansion processing device 406 is connected in the sleep mode 304. If the expansion processing device 406 is connected (YES in step S5020), the CPU 201B maintains the state of the sleep mode 304. On the other hand, if the expansion processing device 406 is not connected (NO in step S5020), the processing proceeds to step S5021. In step S5021, the CPU 201B determines whether any network response has occurred. The main controller 101 includes a timer (not illustrated) that starts counting when the CPU 201B ends transmission of the most recent network response, and resets the timer when any network response is transmitted by the CPU 201B in step S5021 (YES in step S5021). In the network response processing executed by the CPU 201B, the CPU 201B executes processing for reading data from the HDD 402 and returning a response based on the read data with respect to an inquiry about data stored in the HDD 402 which is transmitted from an external device. In step S5022, the CPU 201B determines whether a value counted after the CPU 201B ends transmission of the most recent network response exceeds a predetermined time. If the predetermined time has not passed (NO in step S5022), the processing returns to step S5021. In step S5021, the CPU 201B waits for a network response. On the other hand, if the predetermined time has passed after the CPU 201B ends transmission of the most recent network response (YES in step S5022), i.e., the image forming apparatus 100 has been in a state where the CPU 201B does not have to transmit a network response for a predetermined time, the processing proceeds to step S5023. In step S5023, the CPU 201B starts control processing for shifting the operation mode to the deep-sleep mode 305. Next, in step S5024, the CPU 201B stops the power to the semiconductor integrated circuits 200A and 200B, and the HDD 402 which are not necessary for the deep-sleep mode 305 so as to reduce the power consumption of the image forming apparatus 100.

The flowchart in FIG. 5D illustrates processing for shifting the image forming apparatus 100 to the sleep mode 304 from the deep-sleep mode 305. When an interrupt signal is transmitted to the power control unit 210B from the LAN controller 407 or the operation unit 102, the power control unit 210B supplies power to the semiconductor integrated circuits 200A and 200B, and the HDD 402. Although the power supply to the operation unit 102 is stopped in the deep-sleep mode 305, the touch panel (not illustrated) transmits, to the power control unit 210B, an interrupt signal for returning the operation mode from the deep-sleep mode 305 when an operation input is received from the user. In step S5030, the CPU 201B determines whether an interrupt signal for returning the operation mode from the deep-sleep mode 305 is received from the operation unit 102. When an interrupt signal for returning the operation mode from the deep-sleep mode 305 is received from the operation unit 102 (YES in step S5030), the processing proceeds to step S5032. In step S5032, the CPU 201B starts processing for returning to the sleep mode 304. On the other hand, in a case where an interrupt signal for returning the operation mode from the deep-sleep mode 305 is not received from the operation unit 102 (NO in step S5030), the processing proceeds to step S5031. In step S5031, the CPU 201B determines whether a network packet to which the LAN controller 407 cannot respond is received. If a network packet to which the LAN controller 407 cannot respond is received (YES in step S5031), the LAN controller 407 transmits, to the power control unit 210B, an interrupt signal for returning the operation mode from the deep-sleep mode 305. The processing proceeds to step S5032 when the power control unit 210B receives the interrupt signal for returning the operation mode from the deep-sleep mode 305 from the LAN controller 407. In step S5032, upon receipt of an instruction from the power control unit 210B, the CPU 201B starts processing for returning the operation mode to the sleep mode 304. Further, if a network packet to which the LAN controller 407 can respond is received (NO in step S5031), the LAN controller 407 returns a response, and the processing returns to step S5030. In step S5030, the operation unit 102 waits for an operation input from the user. In step S5032, the processing for returning the operation mode to the sleep mode 304 is started. Then, in step S5033, the power control unit 210B supplies power to the semiconductor integrated circuits 200A and 200B, and the HDD 402.

The flowchart in FIG. 5E illustrates processing for shifting the image forming apparatus 100 to the print mode 303 from the sleep mode 304. This flowchart is executed by the CPU 201B controlling the various devices of the image forming apparatus 100 according to a program executed in the DRAM 401B. Although the power supply to the operation unit 102 is stopped in the sleep mode 304, the touch panel transmits an interrupt signal for returning the operation mode from the sleep mode 304 to the power control unit 210B when an operation input is received from the user. In step S5040, the CPU 201B determines whether an interrupt signal for returning the operation mode from the sleep mode 304 is received from the operation unit 102. When an interrupt signal for returning the operation mode from the sleep mode 304 is received from the operation unit 102 (YES in step S5040), the processing proceeds to step S5042. In step S5042, upon receipt of the instruction from the power control unit 210B, the CPU 201B starts processing for returning the operation mode to the print mode 303. Even in a case where the touch panel does not receive any operation input from the user, upon receipt of a print job which uses the printer 104 via the LAN 106 (YES in step S5041), the processing proceeds to step S5042. In step S5042, the CPU 201B starts processing for returning the operation mode to the print mode 303. If a print job which uses the printer 104 is not received (NO in step S5041), the processing returns to step S5040, and the touch panel waits for an operation input from the user. If the processing for returning the operation mode to the print mode 303 is started in step S5042, then in step S5043, the power control unit 210B supplies power to the printer 104.

The flowchart in FIG. 5F illustrates processing for shifting the image forming apparatus 100 to the copy mode 302 from the print mode 303. This flowchart is executed by the CPU 201B controlling the various devices of the image forming apparatus 100 according to a program executed in the DRAM 401B. Although the power supply to the operation unit 102 is stopped in the print mode 303, upon receipt of an operation input from the user, the operation unit can transmit an interrupt signal for returning the operation mode from the print mode 303 to the CPU 201B. In step S5050, the CPU 201B determines whether to receive an interrupt signal for returning the operation mode from the print mode 303 from the operation unit 102. If the CPU 201B receives an interrupt signal for returning the operation mode from the print mode 303 from the operation unit 102 (YES in step S5050), the processing proceeds to step S5051. In step S5051, the CPU 201B starts processing for returning the operation mode to the copy mode 302. On the other hand, if the operation unit 102 does not receive any operation input from the user (NO in step S5050), the operation unit 102 waits for the operation input from the user in step S5050. If processing for returning the operation mode to the copy mode 302 is started in step S5051, then in step S5052, the CPU 201B instructs the power control unit 210B to supply power to the operation unit 102 and the scanner 103.

<Detailed Description of Operation Mode>

Details of the main controller 101 in the low power states (power saving states) of the respective operation modes illustrated in FIG. 4 will be described with reference to FIGS. 6, 7, and 8.

Figure 6:
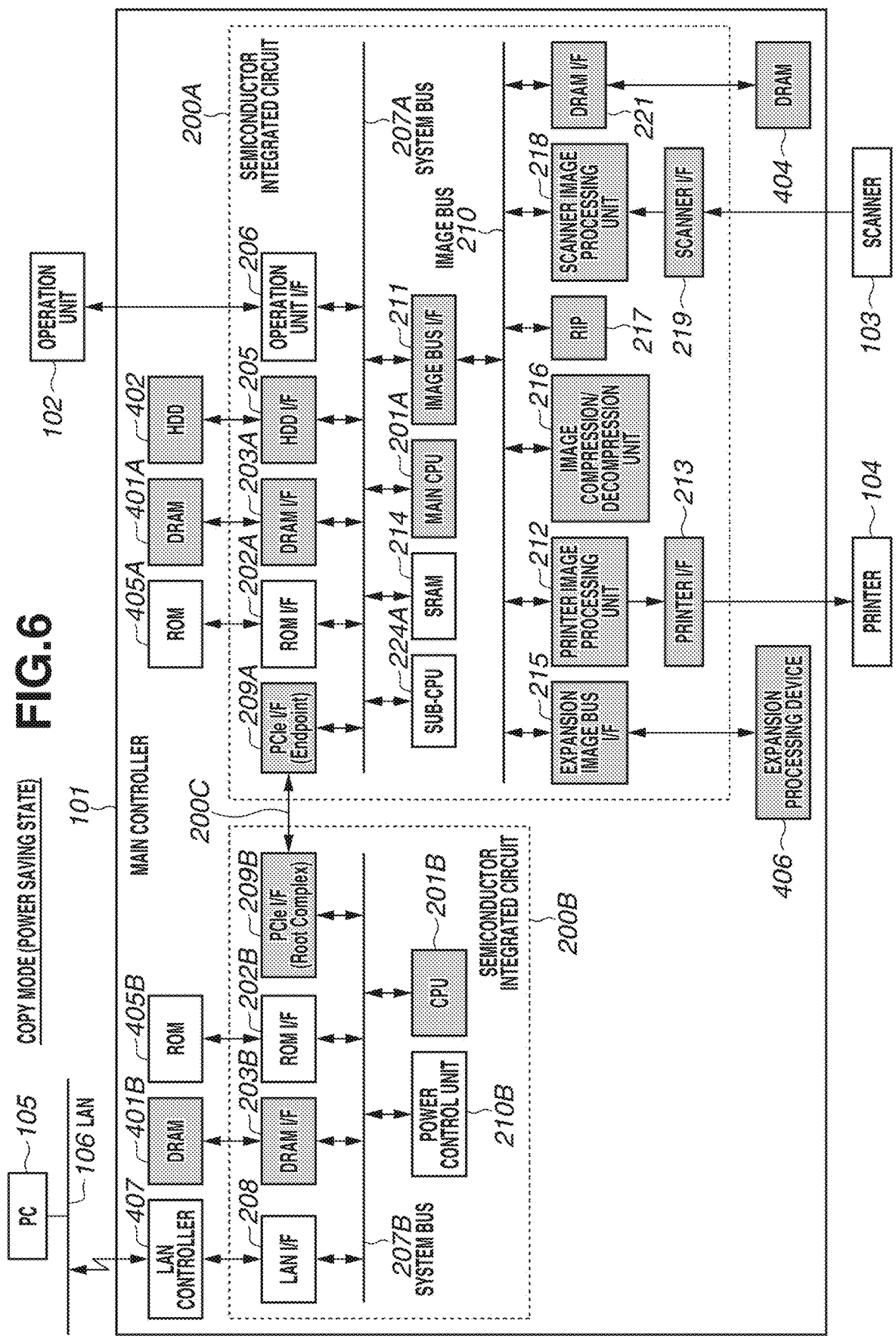
FIG. 6 is a configuration diagram of the main controller illustrating a power saving state in a copy mode according to the embodiment of the present invention.

FIG. 6 is a block diagram illustrating a state of the main controller 101 in the low power state (power saving state) 302B of the copy mode 302. The shaded portions in FIG. 6 indicate modules that are in the power saving state. In the shifting from the active state 302A to the low power state (power saving state) 302B as illustrated in FIG. 3, a module of the semiconductor integrated circuit 200B is shifted to the low power state (power saving state) 302B when the CPU 201B is in an idle state without executing processing to be executed. The main CPU 201A, the HDD 402, the HDD I/F 205, the DRAM 401A, the DRAM I/F 203A are shifted to the power saving state when the PCIe bus 200C is shifted to an L3 state or an L1 state. In the L3 state, a clock supplied to the PCIe bus 200C is stopped. Further, in the L1 state, the frequency of the clock supplied to the PCIe bus 200C is lowered.

The main CPU 201A controls the rest of the modules to be shifted to the active state only when they are used and to be shifted to the power saving state when they are not used. On the contrary, when the power state is shifted from the low power state (power saving state) to the active state, for example, the CPU 201B returns from the low power state (power saving state) at a timing when PDL printing processing is received from the LAN I/F 208 and causes the semiconductor integrated circuit 200A to return via the PCIe I/F 209B. In the copy mode 302, since the processing needs to be promptly started when the instruction of copy processing is input by the user, the operation unit 102, the scanner 103, and the printer 104 which are connected to the semiconductor integrated circuit 200A are in the active state so as to execute the processing immediately. As modules of the semiconductor integrated circuit 200B that are in the power saving state, in contrast, the CPU 201B is in the C3 state, and the DRAM 401B is in a Self-Refresh state. Further, the PICe I/F 209B and the PCIe I/F 209A are in the D3 state. The sub-CPU 224A shifts the HDD 402, the DRAM 401A, and the main CPU 201A to the power saving state at a timing when the PCIe I/F 209A is shifted to the D3 state. This processing will be described in detail below. Further, image processing modules connected to the image bus 210 are in a clock-gate state where supply of the clock is stopped, and the DRAM 404 is in the Self-Refresh state. The expansion processing device 406 is also in the clock-gate state. The CPU 201B executes the above-described processing with respect to the semiconductor integrated circuit 200B, and the main CPU 201A or the sub-CPU 224A executes the processing with respect to the semiconductor integrated circuit 200A.

Figure 7:
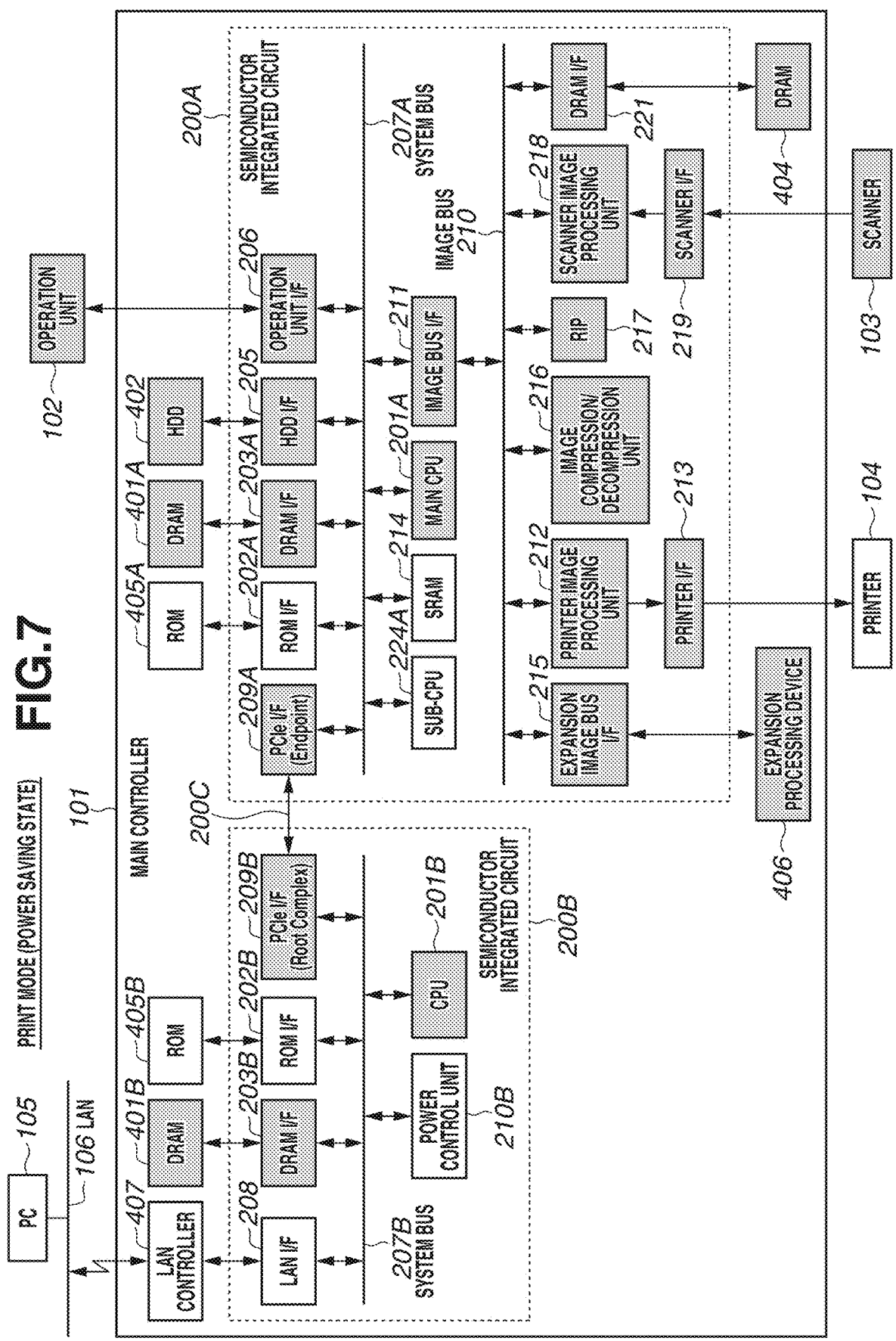
FIG. 7 is a configuration diagram of the main controller illustrating the power saving state in a print mode according to the embodiment of the present invention.

FIG. 7 is a block diagram illustrating a state of the main controller 101 in the low power state (power saving state) 303B of the print mode 303. The state in FIG. 7 is approximately the same as the state in the copy mode 302 in FIG. 6, and different in that the operation unit 102 and the scanner 103 are in the power saving state.

Figure 8:
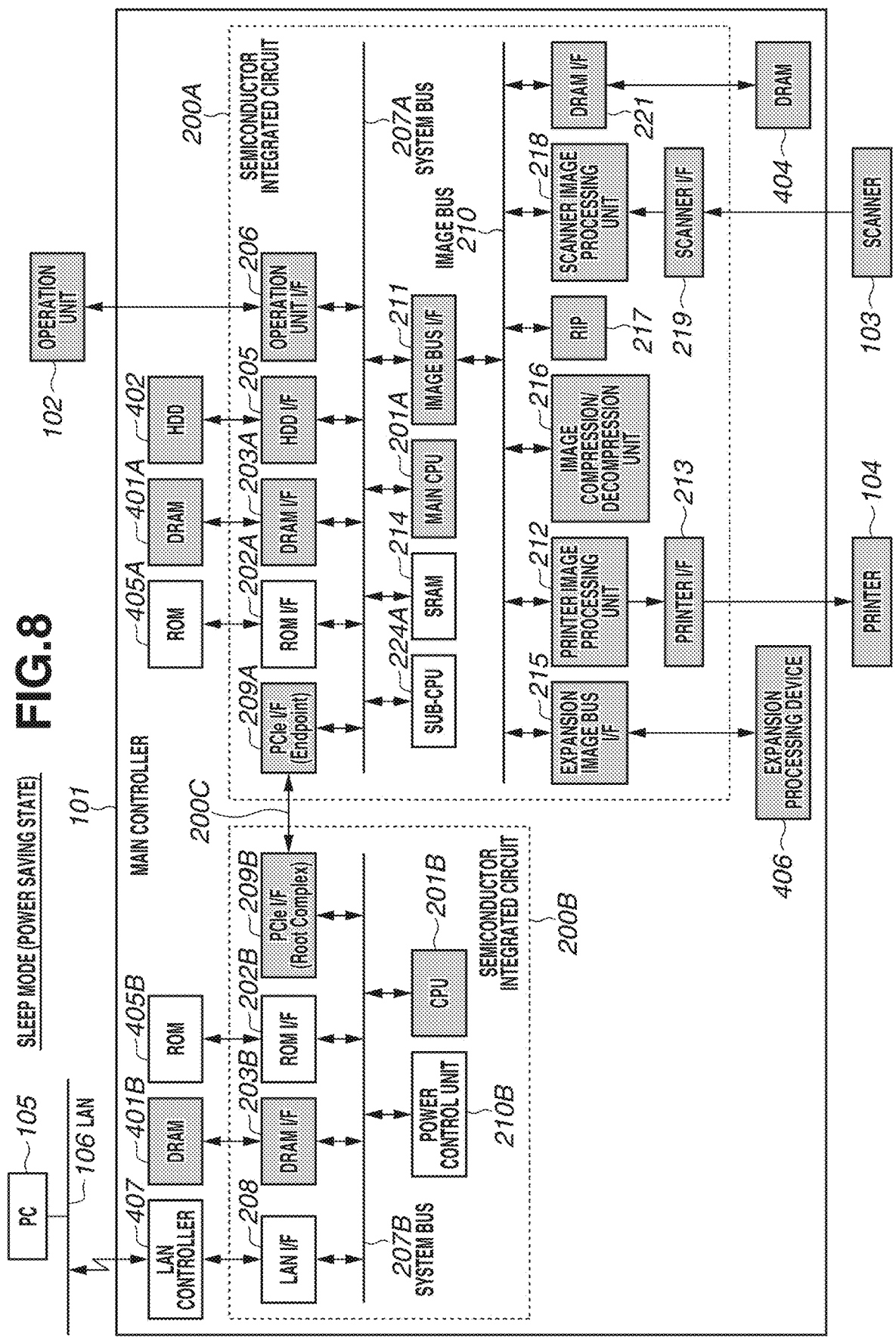
FIG. 8 is a configuration diagram of the main controller illustrating the power saving state in a sleep mode according to the embodiment of the present invention.

FIG. 8 is a block diagram illustrating a state of the main controller 101 in the power saving state 304B of the sleep mode 304. The state in FIG. 8 is different from that of the print mode 303 in FIG. 7 in that power supplied to the printer 104 is stopped. Further, in the sleep mode 304, the image processing modules connected to the image bus 210 are shifted to a state where power supply is stopped from the clock-gate state where supply of a clock is stopped, and power supplied to the DRAM 404 is also stopped, so as to enhance the power saving effect.

<Power Saving State of PCIe Function>

Figure 9:
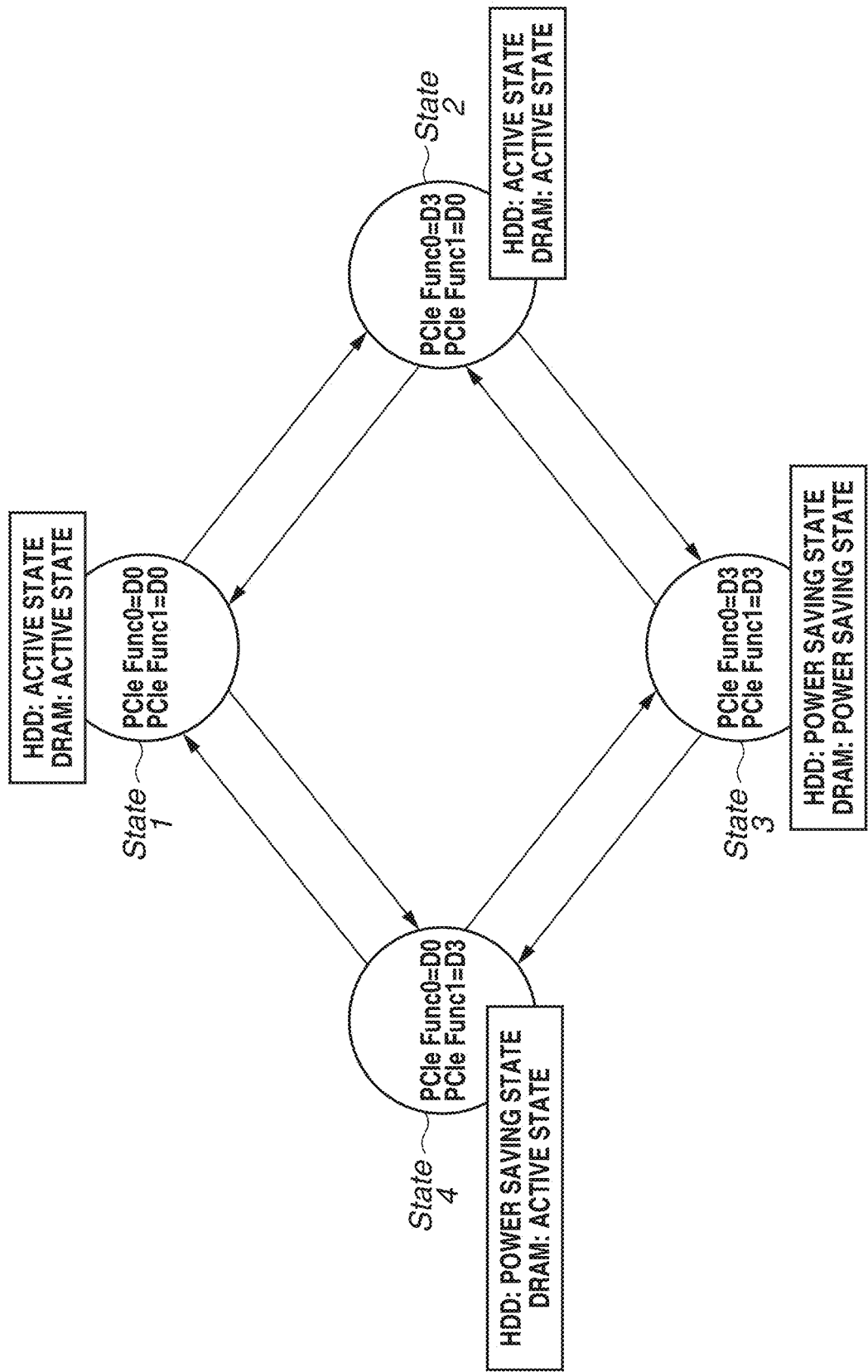
FIG. 9 is a state diagram illustrating states of peripheral component interconnect express (PCIe) functions and devices according to the embodiment of the present invention.

FIG. 9 is a diagram illustrating the power saving states of the functions of the PCIe I/F 209A and the power saving states of the HDD 402 and the DRAM 401A of the semiconductor integrated circuit 200A of the present invention. The PCIe I/F 209A has a plurality of registers. The PCIe I/F 209A has at least two registers "Func 0" and "Func 1". The HDD 402 is allocated to the Func 1, and the DRAM 401A is allocated to the Func 0.

In a State 1, both of the Func 0 and Func 1 are in the D0 state, i.e., the active state, and the HDD 402 and the DRAM 401A are also in the active state. In a State 2, the Func 0 is in the D3 state, i.e., the power saving state, the Func 1 is in the D0 state, i.e., the active state, and the HDD 402 and the DRAM 401A are in the active state. Although the Func 0 is in the D3 state, the DRAM 401A is set to the active state because the DRAM 401A is used when the HDD 402 is operated. In a State 3, both of the Func 0 and the Func 1 are in the D3 state, i.e., the power saving state, and both of the HDD 402 and the DRAM 401A are in the power saving state. In a State 4, the Func 0 is in the D0 state, i.e., the active state, the Func 1 is in the D3 state, i.e., the power saving state, and the HDD 402 and the DRAM 401A are in the power saving state and the active state, respectively.

The states of the PCIe functions, the HDD 402, and the DRAM 401A are defined by the above-described States 1 to 4.

<Power Saving Shifting Flow>

Figure 10:
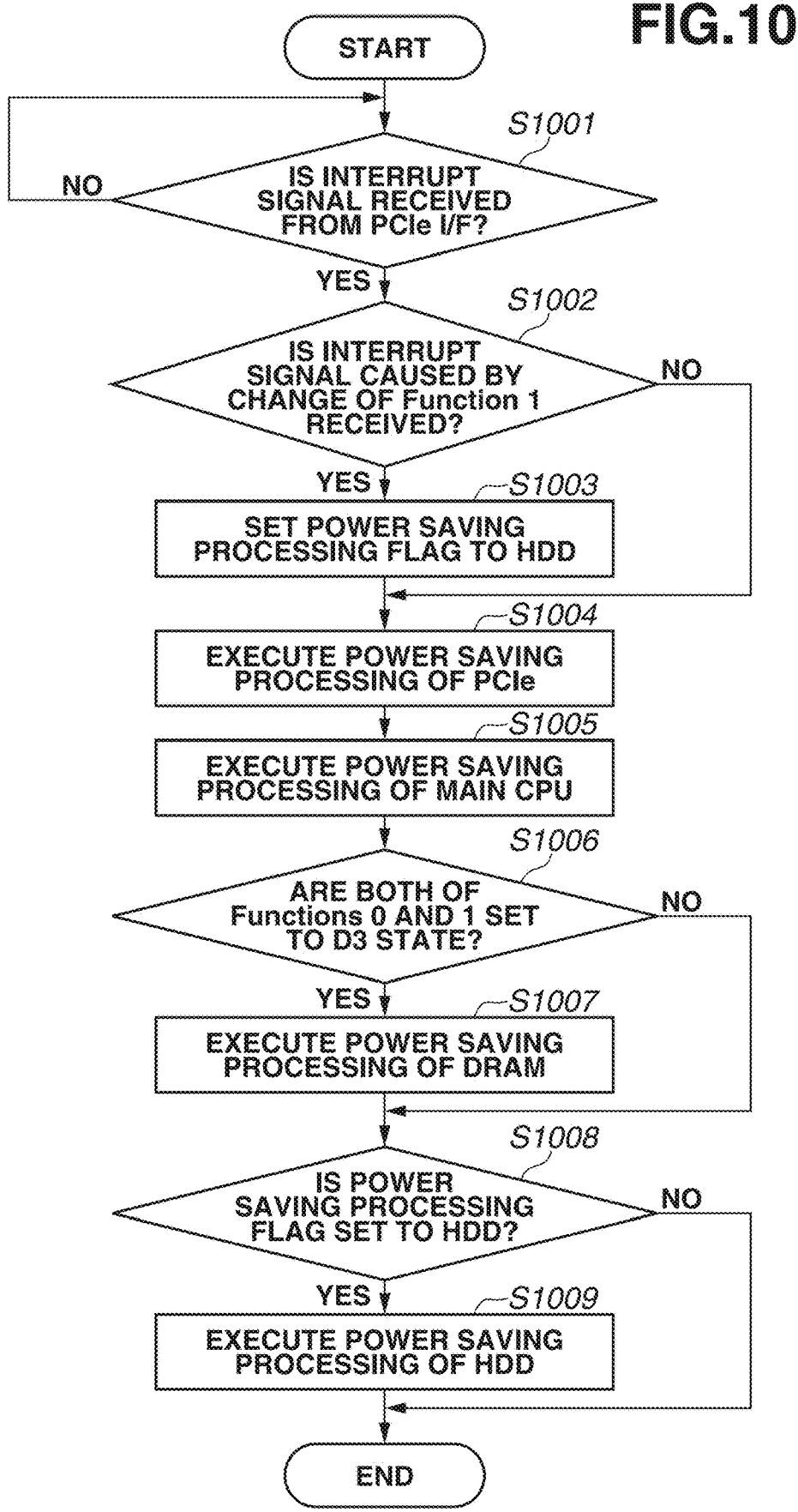
FIG. 10 is a flowchart illustrating processing for shifting a power state to the power saving state in conjunction with the PCIe functions according to the embodiment of the present invention.

FIG. 10 is an example of a flowchart illustrating processing for shifting the HDD 402 and the DRAM 401A to the power saving state. The sub-CPU 224A of the semiconductor integrated circuit 200A executes processing according to a program stored in the ROM 405A to realize the flowchart in FIG. 10.

The CPU 201B of the semiconductor integrated circuit 200B shifts the PCIe I/F 209A to the D3 state. The PCIe I/F 209A can be shifted to the D3 state by setting the register of the PCIe I/F 209A. In step S1001, it is determined whether the sub-CPU 224A receives an interrupt signal from the PCIe I/F 209A. The PCIe I/F 209A outputs an interrupt signal when any one of the registers of the PCIe I/F 209A, i.e., Func 0 and the Func 1, is set to the D3 state. If the sub-CPU 224A receives the interrupt signal from the PCIe I/F 209A (YES in step S1001), the processing proceeds to step S1002. The sub-CPU 224A, upon receipt of the interrupt signal, shifts the PCIe I/F 209A to the D3 state and the PCIe bus 200C to the L3 state or the L1 state. By executing the above processing, the PCIe bus 200C is brought into a non-communicable state or a state communicable only at low speed. When the PCIe I/F 209A is shifted to the D3 state, a clock supplied to the PCIe I/F 209A is stopped.

In step S1002, the sub-CPU 224A determines whether the received interrupt signal is an interrupt signal caused by change of the Func 1. If the sub-CPU 224A determines that the received interrupt signal is the interrupt signal caused by change of the Func 1 (YES in step S1002), the processing proceeds to step S1003. If the sub-CPU 224A determines that the received interrupt signal is the interrupt signal caused by change of the Func 0 (NO in step S1002), the processing proceeds to step S1004. In step S1003, the sub-CPU 224A sets a power saving flag for the HDD 402. This flag is set in a register area (not illustrated) accessible by the sub-CPU 224A.

In step S1004, the sub-CPU 224A stops or reduces a the clock supply to a module within the semiconductor integrated circuit 200A which is not used, or stops the power supply to a module that is not used.

Further, in step S1005, the sub-CPU 224A shifts the main CPU 201A to the power saving state. The power saving state of the main CPU 201A refers to a wait-for-interrupt state or a clock-gate state. Since the main CPU 201A accesses the HDD 402 or the DRAM 401A, the main CPU 201A is shifted to the power saving state before the HDD 402 or the DRAM 401A is shifted to the power saving state. Then, the processing proceeds to step S1006.

In step S1006, the sub-CPU 224A determines whether both of the Func 0 and the Func 1 which the CPU 201B sets to the power saving state are in the D3 state. If both of the Func 0 and the Func 1 are in the D3 state (YES in step S1006), the processing proceeds to step S1007. If not both of the Func 0 and the Func 1 are in the D3 state (NO in step S1006), the processing proceeds to step S1008.

In step S1007, the sub-CPU 224A shifts the DRAM 401A to the power saving state. The power saving state of the DRAM 401A refers to a Self-Refresh state or a power down state. The sub-CPU 224A shifts the DRAM 401A to the power saving state by accessing the register of the DRAM I/F 203A.

In step S1008, the sub-CPU 224A determines whether a power saving flag is set to the HDD 402. If the flag is set (YES in step S1008), the processing proceeds to step S1009. If the flag is not set (NO in step S1008), the processing is ended.

In step S1009, the sub-CPU 224A shifts the HDD 402 to the power saving state. Specifically, the sub-CPU 224A shifts the HDD 402 to the Slumber state. In addition, in a case where a solid state drive (SSD) is used in place of the HDD 402, the sub-CPU 224A shifts the SSD to a Dev-Sleep state. The sub-CPU 224A shifts the HDD 402 to the power saving state by setting the register of the HDD I/F 205.

By the above-described processing flow, the HDD 402 and the DRAM 401A are shifted to the power saving state after the PCIe I/F 209A is shifted to the D3 state. By executing the above-described processing, an application operating on the CPU 201B will not access the HDD 402 or the DRAM 401A when the HDD 402 or the DRAM 401A is being shifted or has been shifted to the power saving state, so that occurrence of the time-out error can be prevented.

In the above-described present embodiment, although two PCIe functions have been described, the number of PCIe functions is not limited to the above, and two or more PCIe functions may be provided. Further, although the HDD 402 and the DRAM 401A have been described as the devices connected to the PCI device, another device such as an SSD can be connected thereto as long as the device can be shifted to the power saving state.

<Power Saving Returning Control Flow>

Figure 11:
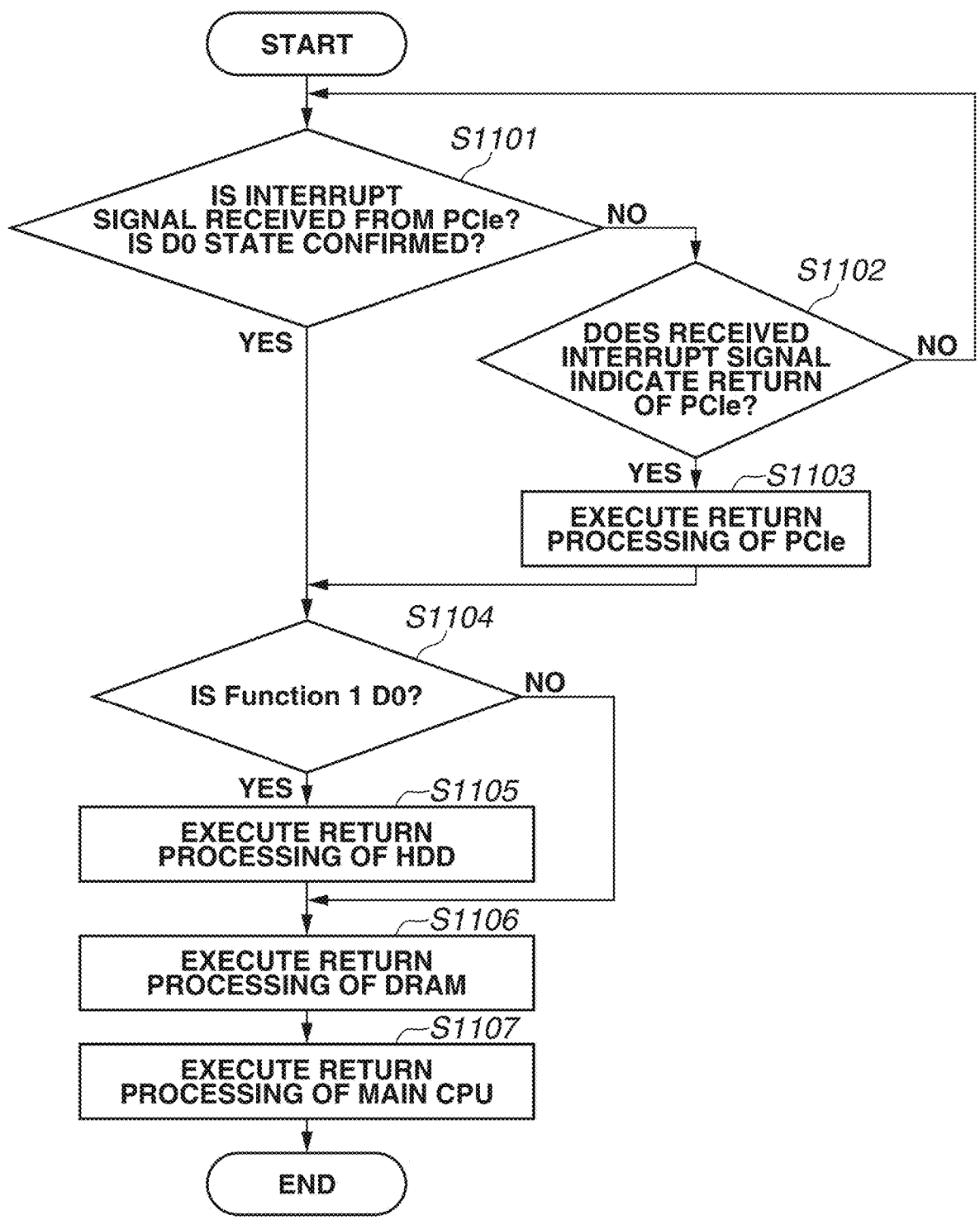
FIG. 11 is a flowchart illustrating processing for returning from the power saving state in conjunction with the PCIe functions according to the embodiment of the present invention.

FIG. 11 is a flowchart illustrating processing for returning the HDD 402 and the DRAM 401A from the power saving state. The sub-CPU 224A of the semiconductor integrated circuit 200A executes the processing according to a program stored in the ROM 405A to realize the flowchart in FIG. 11.

In step S1101, the sub-CPU 224A determines whether the interrupt signal is received from the PCIe I/F 209A. When the CPU 201B sets either one of the Func 0 and the Func 1 of the PCIe I/F 209A to the D0 state, the PCIe I/F 209A outputs the interrupt signal. In addition, the CPU 201B can set the function of the PCIe I/F 209A even if the PCIe I/F 209A is in the D3 state. If the interrupt signal is received and either one of the functions is set to the D0 state (YES in step S1101), the processing proceeds to step S1104. If either one of the functions is not set to the D0 state although the interrupt signal is received (NO in step S1101), the processing proceeds to step S1102.

In step S1102, the sub-CPU 224A determines whether the interrupt signal received in step S1101 indicates a return of the semiconductor integrated circuit 200A. A return instruction from the root complex of the PCIe which causes the CPU 201B to return and a return instruction from the end point of the PCIe which causes the semiconductor integrated circuit 200A to return are given as the factors which cause the PCIe to return from the power saving state. In step S1102, the sub-CPU 224A determines whether a return instruction is provided from the end point, and in step S1101, the sub-CPU 224A determines whether a return instruction is provided from the root complex. If the sub-CPU 224A determines that the return instruction is provided from the end point (YES in step S1102), the processing proceeds to step S1103. If the return instruction is not from the end point (NO in step S1102), the processing returns to step S1101.

In step S1103, the return processing is executed according to the return instruction from the end point of the PCIe. In the return processing, first, the root complex is informed about the return. Specifically, a method of informing the root complex about the return by using a wake signal or a beacon can be employed, although the method thereof should be changed depending on the power saving state and the settings. By the processing with respect to the root complex, the power state is returned from the D3 state to the D0 state. A known method is used for the above-described return processing, so that detailed descriptions thereof will be omitted. When the return processing is completed, the processing proceeds to step S1104.

In step S1104, the sub-CPU 224A determines whether the Func 1 of the PCIe I/F 209A is in the D0 state. If the Func 1 is in the D0 state (YES in step S1104), the processing proceeds to step S1105. If the Func 1 is in the D3 state (NO in step S1104), the processing proceeds to step S1106. In step S1105, the HDD 402 is returned from the power saving state to the active state. The processing for returning the HDD 402 to the active state varies depending on the power saving state. A known method is used for the above-described return processing, so that detailed descriptions thereof will be omitted. In step S1106, the DRAM 401A is returned from the power saving state to the active state. The processing for returning the DRAM 401A to the active state is executed by setting the register of the DRAM I/F 203A.

In step S1107, the main CPU 201A is returned from the power saving state.

By the above-described processing flow, the processing for returning the power state from the power saving state can be executed with respect to the two functions of the PCIe I/F 209A. In the above-described present embodiment, although two PCIe functions have been described, the number of PCIe functions is not limited to the above, and two or more PCIe functions may be provided. Further, although the HDD 402 and the DRAM 401A have been described as the devices connected to the PCI device, devices of any type can be connected without any problem.

Other Embodiments

In the above-described embodiment, an image forming apparatus has been described as an example of the electronic apparatus of the present invention. However, the electronic apparatus according to the present invention is not limited to an image forming apparatus. For example, the electronic apparatus of the preset invention is applicable to various electronic apparatuses such as a notebook computer, a tablet PC, a desktop PC, a smartphone, an automobile, an air-conditioning apparatus, a gaming machine, and a robot.

In the above-described embodiment, the sub-CPU, upon receipt of an interrupt signal, shifts the PCI bus to a non-communicable state or a state communicable only at low speed. However, the CPU 201B or the PCIe I/F 209A may shift the PCI bus to the non-communicable state or the state communicable only at low speed without receiving an instruction from the sub-CPU.

According to the aspect of the present invention, a device connected to a PCI device can be shifted to a power saving state without having an access error.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2019-020148, filed Feb. 6, 2019, which is hereby incorporated by reference herein in its entirety.

What is claimed is:

1. An electronic apparatus comprising:
a first device;
a second device connected to the first device via a peripheral component interconnect (PCI) bus; and
a hard disk drive (HDD) connected to the second device and that can be shifted to a slumber state,
wherein the second device brings a state of the PCI bus into a non-communicable state or a state communicable at low speed, and
wherein the second device shifts the HDD to the slumber state after the PCI bus is shifted to the non-communicable state or the state communicable at low speed.

2. The electronic apparatus according to claim 1,
wherein the second device includes a PCI interface to which the PCI bus is connected and a sub-processor that changes a power state of the HDD, and
wherein the PCI interface outputs a predetermined signal to the sub-processor, so that the sub-processor changes the power state of the HDD to the slumber state according to the predetermined signal.

3. The electronic apparatus according to claim 2, wherein the sub-processor changes the power state of the HDD to the slumber state by stopping a clock to the HDD or stopping a power supply to the HDD.

4. The electronic apparatus according to claim 2,
wherein the second device further includes a main processor, and
wherein the sub-processor brings the main processor into a power saving state according to the predetermined signal.

5. The electronic apparatus according to claim 4, wherein the power saving state of the main processor is a wait-for-interrupt state.

6. The electronic apparatus according to claim 2, wherein the PCI interface includes a plurality of resisters corresponding to functions, and outputs the predetermined signal to the sub-processor when a predetermined value is stored in at least one of the plurality of resisters.

7. The electronic apparatus according to claim 6, wherein the PCI interface brings the PCI bus into the non-communicable state or the state communicable at low speed according to an instruction from the sub-processor that receives the predetermined signal.

8. The electronic apparatus according to claim 6, wherein the PCI interface brings the PCI bus into the non-communicable state or the state communicable at low speed when a predetermined value is stored in at least one of the plurality of resisters.

9. The electronic apparatus according to claim 6, wherein the sub-processor shifts the HDD to the slumber state according to a value of a predetermined resister from among the plurality of resisters and shifts another device different from the HDD to a slumber state according to values of a plurality of predetermined resisters from among the plurality of resisters.

10. The electronic apparatus according to claim 9, wherein the another device is a dynamic random access memory (DRAM).

11. The electronic apparatus according to claim 1, further comprising a printer.

12. The electronic apparatus according to claim 1, further comprising a scanner.

13. A control method of an electronic apparatus including a first device, a second device connected to the first device via a peripheral component interconnect (PCI) bus, and a hard disk drive (HDD) connected to the second device and that can be shifted to a slumber state, the control method comprising:
bringing a state of the PCI bus into a non-communicable state or a state communicable at low speed; and
shifting the HDD to the slumber state after bringing the PCI bus into the non-communicable state or the state communicable at low speed.

14. An electronic apparatus comprising:
a first device;
a second device connected to the first device via a peripheral component interconnect (PCI) bus; and
a solid state drive (SSD) connected to the second device and that can be shifted to a Dev-Sleep state,
wherein the second device brings a state of the PCI bus into a non-communicable state or a state communicable at low speed, and
wherein the second device shifts the SSD to the Dev-Sleep state after the PCI bus is shifted to the non-communicable state or the state communicable at low speed.

15. The electronic apparatus according to claim 14, wherein the second device includes a PCI interface to which the PCI bus is connected and a sub-processor that changes a power state of the SSD, and
wherein the PCI interface outputs a predetermined signal to the sub-processor, so that the sub-processor changes the power state of the SSD to the Dev-Sleep state according to the predetermined signal.

16. The electronic apparatus according to claim 15, wherein the sub-processor changes the power state of the SSD to the Dev-Sleep state by stopping a clock to the SSD or stopping a power supply to the SSD.

17. The electronic apparatus according to claim 15,
wherein the second device further includes a main processor, and
wherein the sub-processor brings the main processor into a power saving state according to the predetermined signal.

18. The electronic apparatus according to claim 17, wherein the power saving state of the main processor is a wait-for-interrupt state.

19. The electronic apparatus according to claim 15, wherein the PCI interface includes a plurality of resisters corresponding to functions, and outputs the predetermined signal to the sub-processor when a predetermined value is stored in at least one of the plurality of resisters.

20. The electronic apparatus according to claim 19, wherein the PCI interface brings the PCI bus into the non-communicable state or the state communicable at low speed according to an instruction from the sub-processor that receives the predetermined signal.

21. The electronic apparatus according to claim 19, wherein the PCI interface brings the PCI bus into the non-communicable state or the state communicable at low speed when a predetermined value is stored in at least one of the plurality of resisters.

22. The electronic apparatus according to claim 19, wherein the sub-processor shifts the SSD to the Dev-Sleep state according to a value of a predetermined resister from among the plurality of resisters and shifts another device different from the SSD to a Dev-Sleep state according to values of a plurality of predetermined resisters from among the plurality of resisters.

23. The electronic apparatus according to claim 22, wherein the another device is a dynamic random access memory (DRAM).

24. The electronic apparatus according to claim 14, further comprising a printer.

25. The electronic apparatus according to claim 14, further comprising a scanner.

26. A control method of an electronic apparatus including a first device, a second device connected to the first device via a peripheral component interconnect (PCI) bus, and a solid state drive (SSD) connected to the second device and that can be shifted to a Dev-Sleep state, the control method comprising:
bringing a state of the PCI bus into a non-communicable state or a state communicable at low speed; and
shifting the SSD to the Dev-Sleep state after bringing the PCI bus into the non-communicable state or the state communicable at low speed.

* * * * *